United States Patent
Yamanishi et al.

(10) Patent No.: US 12,005,507 B2
(45) Date of Patent: Jun. 11, 2024

(54) CEMENTED CARBIDE AND CUTTING TOOL INCLUDING SAME AS SUBSTRATE

(71) Applicant: SUMITOMO ELECTRIC INDUSTRIES, LTD., Osaka (JP)

(72) Inventors: Takato Yamanishi, Osaka (JP); Keiichi Tsuda, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 488 days.

(21) Appl. No.: 17/294,438

(22) PCT Filed: Jul. 3, 2020

(86) PCT No.: PCT/JP2020/026112
§ 371 (c)(1),
(2) Date: May 17, 2021

(87) PCT Pub. No.: WO2021/079561
PCT Pub. Date: Apr. 29, 2021

(65) Prior Publication Data
US 2022/0016715 A1 Jan. 20, 2022

(30) Foreign Application Priority Data

Oct. 25, 2019 (JP) .................................. 2019-194115

(51) Int. Cl.
C22C 29/08 (2006.01)
B23B 27/14 (2006.01)
B23C 5/16 (2006.01)

(52) U.S. Cl.
CPC .............. B23B 27/14 (2013.01); B23C 5/16 (2013.01); C22C 29/08 (2013.01); B23B 2224/20 (2013.01); B23C 2224/20 (2013.01)

(58) Field of Classification Search
None
See application file for complete search history.

(56) References Cited

U.S. PATENT DOCUMENTS

| | | | | |
|---|---|---|---|---|
| 5,580,666 | A * | 12/1996 | Dubensky | C22C 29/08 428/548 |
| 2004/0187638 | A1* | 9/2004 | Heinrich | C22C 29/08 75/240 |
| 2005/0126336 | A1* | 6/2005 | Jansson | C23C 30/005 75/240 |
| 2012/0144753 | A1 | 6/2012 | Okuno et al. | |
| 2016/0016291 | A1* | 1/2016 | Westraadt | C04B 35/52 51/297 |
| 2018/0169766 | A1* | 6/2018 | Yamamoto | B23B 51/00 |

FOREIGN PATENT DOCUMENTS

| | | | |
|---|---|---|---|
| EP | 3366795 A1 * | 8/2018 | |
| JP | 51-106614 A | 9/1976 | |
| JP | 56-139647 A | 10/1981 | |
| JP | 61-76645 A | 4/1986 | |
| JP | 2-22438 A | 1/1990 | |
| JP | 7-138692 A | 5/1995 | |
| JP | 8-218145 A | 8/1996 | |
| JP | 2001-515961 A | 9/2001 | |
| JP | 2002-205207 A | 7/2002 | |
| JP | 2009-504926 A | 2/2009 | |
| JP | 2011-042830 A | 3/2011 | |
| JP | 2013-181188 A | 9/2013 | |
| JP | 2018-070987 A | 5/2018 | |
| WO | 99/13119 A1 | 3/1999 | |
| WO | 2007/022514 A2 | 2/2007 | |
| WO | WO-2017/148885 A1 * | 9/2017 | |

OTHER PUBLICATIONS

Japanese Office Action dated Jul. 11, 2023 for corresponding Japanese Patent Application No. 2021-512588 with Machine Translation.
Carbide Property Table, Homepage, Technical Material, Nihon New Metal Company, http://www.jnm.co.jp/ja/rd/data/carbide_character_table.html , a high melting point compound manual (Moscowa Metallurgical Publishing Institute) (1976) (for concise explanation, see Japanese Office Action dated Jul. 11, 2023 for corresponding Japanese Patent Application No. 2021-512588 with Machine Translation).

* cited by examiner

*Primary Examiner* — George Wyszomierski
(74) *Attorney, Agent, or Firm* — Renner, Otto, Boisselle & Sklar, LLP

(57) ABSTRACT

A cemented carbide includes a first hard phase, a second hard phase, and a binder phase, wherein the first hard phase is composed of tungsten carbide grains, the second hard phase is composed of carbide grains including niobium or tantalum as a constituent element, the binder phase includes cobalt, nickel, and chromium as constituent elements, at least part of the carbide grains further include tungsten as a constituent element, and when a volume ratio of the second hard phase to the cemented carbide is represented by A volume % and a volume ratio of a total of a niobium element and a tantalum element to the cemented carbide is represented by B volume %, a ratio A/B of A to B is more than 1.2.

7 Claims, No Drawings

CEMENTED CARBIDE AND CUTTING TOOL INCLUDING SAME AS SUBSTRATE

TECHNICAL FIELD

The present disclosure relates to a cemented carbide and a cutting tool including the cemented carbide as a substrate. The present application claims a priority based on Japanese Patent Application No. 2019-194115 filed on Oct. 25, 2019, the entire content of which is incorporated herein by reference.

BACKGROUND ART

Conventionally, a cemented carbide including a hard phase having tungsten carbide (WC) as a main component and a binder phase having an iron group element as a main component has been used as a material of a cutting tool. Characteristics required for the cutting tool include: strength (for example, deflective strength); toughness (for example, fracture toughness); hardness (for example, Vickers hardness); plastic deformation resistance; wear resistance; reaction resistance, heat resistance, and the like.

CITATION LIST

Patent Literature

PTL 1: Japanese National Patent Publication No. 2001-515961

SUMMARY OF INVENTION

A cemented carbide according to the present disclosure includes a first hard phase, a second hard phase, and a binder phase, wherein
  the first hard phase is composed of tungsten carbide grains,
  the second hard phase is composed of carbide grains including niobium or tantalum as a constituent element,
  the binder phase includes cobalt, nickel, and chromium as constituent elements,
  at least part of the carbide grains further include tungsten as a constituent element, and
  when a volume ratio of the second hard phase to the cemented carbide is represented by A volume % and a volume ratio of a total of a niobium element and a tantalum element to the cemented carbide is represented by B volume %, a ratio A/B of A to B is more than 1.2.

A cutting tool according to the present disclosure includes the cemented carbide as a substrate.

DETAILED DESCRIPTION

Problem to be Solved by the Present Disclosure

In recent years, improvement of cutting efficiency in cutting a difficult-to-cut material such as Inconel (registered trademark) and a titanium alloy has been required. However, when the above-described difficult-to-cut material is cut, the cutting tool tends to have a high temperature during the cutting. Therefore, the life of the cutting tool when cutting such a difficult-to-cut material tends to be extremely shorter than that when cutting an iron-based material (for example, steel). In view of such background, a cemented carbide having excellent heat resistance have been under review. For example, Japanese National Patent Publication No. 2001-515961 (PTL 1) discloses corrosion and oxidation resistant cemented carbide containing WC and 6-15 wt-% binder phase whereby the binder phase contains 8-12 wt-% Cr+Mo, characterised in that the average WC grain size is 3-10 μm and the total carbon content is in the interval of 6.13−(0.05±0.007)×binder phase (Co+Ni) content in wt-%.

Thus, improvement in various characteristics of a cemented carbide used as a substrate of a cutting tool have been required. In particular, a demand arises in a cemented carbide having high reaction resistance and high heat resistance.

The present disclosure has been made in view of the above circumstances, and has an object to provide a cemented carbide having excellent reaction resistance and heat resistance, and a cutting tool including the cemented carbide as a substrate.

Advantageous Effect of the Present Disclosure

According to the present disclosure, there can be provided a cemented carbide having excellent reaction resistance and heat resistance, and a cutting tool including the cemented carbide as a substrate.

DESCRIPTION OF EMBODIMENTS

First, contents of one embodiment of the present disclosure are listed and described.

[1] A cemented carbide according to one embodiment of the present disclosure includes a first hard phase, a second hard phase, and a binder phase, wherein
  the first hard phase is composed of tungsten carbide grains,
  the second hard phase is composed of carbide grains including niobium or tantalum as a constituent element,
  the binder phase includes cobalt, nickel, and chromium as constituent elements,
  at least part of the carbide grains further include tungsten as a constituent element, and
  when a volume ratio of the second hard phase to the cemented carbide is represented by A volume % and a volume ratio of a total of a niobium element and a tantalum element to the cemented carbide is represented by B volume %, a ratio A/B of A to B is more than 1.2.

Since the cemented carbide has the above-described configuration, large part of the niobium element and the tantalum element are localized in the second hard phase as the carbide grains. As a result, the cemented carbide has excellent reaction resistance and heat resistance. Here, the term "reaction resistance" means resistance against diffusion of an element of a workpiece into the cemented carbide or diffusion of an element of the cemented carbide into the workpiece. It is understandable that the term "heat resistance" refers to resistance against a decrease in hardness, compressive strength, or both of the cemented carbide at a high temperature.

[2] A mass ratio of a total of a cobalt element, a nickel element, and a chromium element to the cemented carbide is preferably more than or equal to 1 mass % and less than or equal to 20 mass %. By defining in this way, the mass ratios of the first hard phase and the second hard phase are relatively high. Therefore, the cemented carbide is excellent in not only reaction resistance and heat resistance but also hardness.

[3] An area ratio of the second hard phase to an arbitrary surface or arbitrary cross section of the cemented carbide is preferably more than or equal to 1% and less than or equal to 30%. By defining in this way, the cemented carbide has more excellent reaction resistance.

[4] An average grain size of the tungsten carbide grains is preferably more than or equal to 0.1 μm and less than or equal to 10 μm. By defining in this way, the cemented carbide is excellent in not only reaction resistance and heat resistance but also balance between hardness and toughness, and an arbitrary hardness level can be selected therefor in accordance with a processing environment.

[5] An average grain size of the carbide grains is preferably more than or equal to 0.1 μm and less than or equal to 5 μm. By defining in this way, the cemented carbide is excellent in not only reaction resistance and heat resistance but also balance between hardness and toughness, and an arbitrary hardness level can be selected therefor in accordance with a processing environment.

[6] A cutting tool according to one embodiment of the present disclosure includes the cemented carbide recited in any one of [1] to [5] as a substrate. Since the cutting tool includes, as the substrate, the cemented carbide having excellent reaction resistance and heat resistance, the cutting tool can have a long life or the like even in cutting of a difficult-to-cut material such as Inconel (registered trademark) or a titanium alloy.

[7] Preferably, the cutting tool further includes a coating film provided on the substrate. Since the coating film is provided on the surface of the substrate, wear resistance and the like of the cutting tool can be improved. Therefore, the cutting tool can have a longer life or the like.

DETAILS OF EMBODIMENTS OF THE PRESENT DISCLOSURE

The following describes one embodiment (hereinafter, referred to as "the present embodiment") of the present disclosure. However, the present embodiment is not limited thereto. Here, in the present specification, the expression "X to Y" represents a range of lower to upper limits (i.e., more than or equal to X and less than or equal to Y). When no unit is indicated for X and a unit is indicated only for Y, the unit of X is the same as the unit of Y. Further, in the present specification, when a compound is expressed by a chemical formula in which a composition ratio of constituent elements is not limited such as "TaC", it is assumed that the chemical formula includes all the conventionally known composition ratios (element ratios). In this case, it is assumed that the above-described chemical formula includes not only a stoichiometric composition but also a non-stoichiometric composition. For example, the chemical formula "TaC" includes not only a stoichiometric composition "$Ta_1C_1$" but also a non-stoichiometric composition such as "$Ta_1C_{0.8}$". The same also applies to compounds other than "TaC". In the present specification, a symbol of element or a name of element may represent a single element or may represent a constituent element in a compound.

<<Cemented Carbide>>

A cemented carbide of the present embodiment includes a first hard phase, a second hard phase, and a binder phase, wherein the first hard phase is composed of tungsten carbide grains, the second hard phase is composed of carbide grains including niobium or tantalum as a constituent element, the binder phase includes cobalt, nickel, and chromium as constituent elements, at least part of the carbide grains further include tungsten as a constituent element, and when a volume ratio of the second hard phase to the cemented carbide is represented by A volume % and a volume ratio of a total of a niobium element and a tantalum element to the cemented carbide is represented by B volume %, a ratio A/B of A to B is more than 1.2.

<First Hard Phase>

The first hard phase is composed of tungsten carbide (hereinafter, also referred to as "WC") grains. Here, WC includes not only "pure WC (inclusive of WC containing no impurity element at all and WC in which an impurity element is less than a detection limit)", but also "WC in which another impurity element is intentionally or inevitably included as long as the effect of the present disclosure is not compromised". The concentration of the impurity in the WC (in the case where the impurity is constituted of two or more elements, the total concentration of the two or more elements) is preferably less than or equal to 5 mass % with respect to the total amount of the WC and the impurity.

(Average Grain Size of WC Grains)

The average grain size of the WC grains in the cemented carbide is preferably more than or equal to 0.1 μm and less than or equal to 10 μm, and is more preferably more than or equal to 0.5 μm and less than or equal to 3 μm. When the average grain size of the WC grains in the cemented carbide is more than or equal to 0.1 μm, the toughness of the cemented carbide tends to be high. Therefore, in a cutting tool including the cemented carbide as a substrate, chipping or breakage due to mechanical and thermal impact can be suppressed. Further, the cutting tool is improved in crack propagation resistance to suppress crack propagation, thereby suppressing chipping or breakage. On the other hand, when the average grain size is less than or equal to 10 μm, the hardness of the cemented carbide tends to be high. Therefore, in the cutting tool including the cemented carbide as a substrate, deformation during cutting is suppressed, thereby further suppressing wear.

Here, the average grain size of the WC grains in the cemented carbide is determined in the following manner: an arbitrary surface or arbitrary cross section of the cemented carbide is processed to be a mirror surface, the processed surface is captured in image using a microscope, and the captured image is subjected to image analysis. The observation magnification on this occasion is, for example, 5000×. Specifically, the respective grain sizes (Heywood diameters: equal-area equivalent circle diameters) of the individual WC grains are calculated from the captured image, and the average value thereof is regarded as the average grain size of the WC grains. At least 100 or more, preferably, 200 or more WC grains are subjected to the measurement. Preferably, in the same cemented carbide, the above image analysis is performed in a plurality of visual fields, and the average value thereof is regarded as the average grain size of the WC grains. The image analysis is preferably performed in 5 or more visual fields, is more preferably performed in 7 or more visual fields, is still more preferably performed in 10 or more visual fields, and is further preferably performed in 20 or more visual fields. One visual field may be represented by, for example, a square with 20 μm in length×20 μm in width, or may be represented by, for example, a rectangle with 9 μm in length×12 μm in width.

Examples of the method for processing to obtain the mirror surface include: a method of polishing using a diamond paste; a method employing a focused ion beam apparatus (FIB apparatus); a method employing a cross section polisher apparatus (CP apparatus); and a method employing these in combination; and the like. Examples of the type of the microscope include a scanning electron microscope (SEM) and the like. The image captured by the microscope is fed into a computer for the purpose of an analysis using image analysis software, thereby obtaining various types of information such as the average grain size. On this occasion, each of the WC grains included in the first hard phase, the carbide grains included in the below-described second hard phase, and the below-described binder phase can be distinguished from the captured image by performing element mapping using an energy dispersive X-ray spectroscopy (EDS) apparatus accompanied with the SEM or the like. More specifically, the grains including WC are regarded as the first hard phase. The phase including Co, Ni, and Cr is regarded as the below-described binder phase. Further, the grains including at least one of Nb and Ta and C are regarded as the below-described second hard phase. As the image analysis software, image analysis type grain size distribution software ("Mac-View" provided by MOUN-TECH) can be suitably used. The average grain size of the below-described carbide grains can be also determined in the same manner.

(Area Ratio of First Hard Phase)

The area ratio of the first hard phase to the arbitrary surface or arbitrary cross section of the cemented carbide according to the present embodiment is preferably more than or equal to 50% and less than or equal to 98%, and is more preferably more than or equal to 80% and less than or equal to 95%. In this case, the total of the area ratio of the first hard phase, the area ratio of the below-described second hard phase, and the area ratio of the below-described binder phase is 100%. The present inventors consider that the area ratio of the first hard phase is a parameter that reflects the volume ratio of the first hard phase. The same applies to the area ratio of the below-described second hard phase and the area ratio of the below-described binder phase. The area ratio of the first hard phase is determined, for example, in the same manner as in the above-described determination of the average grain size of the WC grains, as follows: the arbitrary processed surface of the cemented carbide is captured in image using a microscope and the captured image is subjected to an image analysis. That is, the area ratio of the first hard phase can be determined in the following manner: WC grains in a predetermined visual field are specified, the total of the areas of the specified WC grains is calculated by image processing, and the total of the areas of the specified WC grains is divided by the area of the visual field. Preferably, in the same cemented carbide, the above image analysis is performed in a plurality of visual fields (for example, 5 or more visual fields), and the average value thereof is regarded as the area ratio of the first hard phase. For the image processing, image analysis type grain size distribution software ("Mac-View" provided by MOUN-TECH) can be suitably used. It should be noted that the "predetermined visual field" may be the same as the visual field used when determining the average grain size of the WC grains.

<Second Hard Phase>

The second hard phase is composed of carbide grains including niobium (Nb) or tantalum (Ta) as a constituent element. In the present embodiment, the expression "carbide grains including niobium or tantalum as a constituent element" means carbide grains including one or both of niobium and tantalum as constituent element(s). At least part of the carbide grains further include tungsten (W) as a constituent element. Examples of the carbide included in the carbide grains include NbC, TaC, NbTaC, NbWC, TaWC, NbTaWC, and the like. One of the above-described carbides may be included in the carbide grains solely, or two or more of them may be included therein in combination. Since the cemented carbide includes the second hard phase, the cemented carbide is provided with high reaction resistance and high heat resistance.

It should be noted that in the present specification, when simply stated as "carbide grains", the term "carbide grains" means carbide grains including Nb or Ta in the second hard phase, and does not include the WC grains in the first hard phase.

(Average Grain Size of Carbide Grains)

The average grain size of the carbide grains in the cemented carbide is preferably more than or equal to 0.1 μm and less than or equal to 5 μm, and is more preferably more than or equal to 0.3 μm and less than or equal to 1 μm. When the average grain size of the carbide grains in the cemented carbide is more than or equal to 0.1 μm, the toughness of the cemented carbide tends to be high. Therefore, in a cutting tool including the cemented carbide as a substrate, chipping or breakage due to mechanical and thermal impact can be suppressed. Further, the cutting tool is improved in crack propagation resistance to suppress crack propagation, thereby suppressing chipping or breakage. On the other hand, when the average grain size is less than or equal to 5 μm, the hardness of the cemented carbide tends to be high. Therefore, in the cutting tool including the cemented carbide as a substrate, deformation during cutting is suppressed, thereby further suppressing wear.

The average grain size of the carbide grains is determined in the same manner as in the determination of the average grain size of the WC grains, as follows: the arbitrary surface or arbitrary cross section of the cemented carbide is processed to be a mirror surface, the processed surface is captured in image using a microscope, and the captured image is subjected to image analysis.

(Area Ratio of Second Hard Phase)

The area ratio of the second hard phase to the arbitrary surface or arbitrary cross section of the cemented carbide is preferably more than or equal to 1% and less than or equal to 30%, and is more preferably more than or equal to 2% and less than or equal to 10%. When the area ratio of the second hard phase falls within this range, occurrence of crack due to thermal or mechanical impact can be suppressed and heat resistance and reaction resistance against a workpiece can be further improved while maintaining the hardness of the cemented carbide. It should be noted that when the area ratio of the second hard phase is larger than the upper limit value, the strength of the cemented carbide is decreased to result in decreased toughness. The area ratio of the second hard phase can be calculated in the same manner as in the measurement of the area ratio of the first hard phase, as follows: the "second hard phase" is specified in a predetermined visual field, the total of the areas of the "second hard phase" is calculated, and the total of the areas of the "second hard phase" is divided by the area of the predetermined visual field. Preferably, in the same cemented carbide, the above image analysis is performed in a plurality of visual fields (for example, 5 or more visual fields), and the average value thereof is regarded as the area ratio of the second hard phase.

(Ratio A/B)

In the present embodiment, when the volume ratio of the second hard phase to the cemented carbide is represented by A volume % and the volume ratio of the total of the niobium element and the tantalum element to the cemented carbide is represented by B volume %, a ratio A/B of A to B is more than 1.2. Ratio A/B is preferably more than 1.2 and less than 3. When ratio A/B is more than 1.2, the cemented carbide has excellent reaction resistance and heat resistance.

In the present embodiment, volume ratio A (volume %) of the second hard phase to the cemented carbide is handled with the area ratio of the second hard phase being regarded as volume ratio A. That is, for example, when the area ratio of the second hard phase to the arbitrary surface or arbitrary cross section of the cemented carbide is 10%, volume ratio A of the second hard phase to the cemented carbide is regarded as 10 volume %.

In one aspect of the present embodiment, volume ratio A of the second hard phase is preferably more than or equal to 1 volume % and less than or equal to 30 volume %, and is more preferably more than or equal to 2 volume % and less than or equal to 10 volume %.

Volume ratio B (volume %) of the total of the niobium element and the tantalum element to the cemented carbide is preferably more than or equal to 1 volume % and less than or equal to 15 volume %, and is more preferably more than or equal to 1.7 volume % and less than or equal to 13.1 volume %. Volume ratio B is determined by ICP emission spectrometry (Inductively Coupled Plasma emission spectrometry) (hereinafter, also referred to as "ICP measurement method") in the following manner.

First, the cemented carbide is pulverized into powder. On this occasion, when the cemented carbide is coated with a coating film or the like, the coating film is removed by polishing or the like before the pulverization. Next, commercially available nitric acid (concentration of 60%) and hydrofluoric acid (concentration of 55%) are mixed at a volume ratio of 10:3, thereby preparing a mixed acid aqueous solution of the nitric acid and the hydrofluoric acid (hereinafter, also simply referred to as "mixed acid aqueous solution"). The cemented carbide (0.2 g) in the powder form is introduced into the mixed acid aqueous solution (20 ml) and is dissolved by heat treatment to obtain a solution. Thereafter, the solution is diluted at a dilution factor of 5 with water, thereby obtaining a target sample for ICP measurement. Similarly, the same amount of commercially available high-purity tungsten (purity of more than or equal to 99.99%) as that in the case of the cemented carbide in the ICP measurement method is dissolved in the mixed acid aqueous solution. The obtained solution is diluted at a dilution factor of 5 using a commercially available standard solution for ICP measurement, thereby obtaining a standard sample for preparation of a calibration curve of the ICP measurement. Each of the obtained target sample and standard sample is subjected to ICP measurement to determine the content ratios (mass %) of the elements included in the sample. The obtained mass % of each element by the above measurement is converted into the volume % with the value of the specific gravity described in the Handbook of Chemistry (edited by the Chemical Society of Japan) being employed as the density. Then, volume ratio B is calculated using this. On this occasion, in the case of tungsten, calculation is performed on the assumption that all tungsten exists as tungsten carbide, and a numerical value in the Handbook of Chemistry is used for the density of tungsten carbide.

<Binder Phase>

The binder phase is a phase for binding the WC grains included in the first hard phase, for binding carbide grains included in the below-described second hard phase, or for binding the WC grains included in the first hard phase and the carbide grains included in the second hard phase. The binder phase includes cobalt (Co), nickel (Ni), and chromium (Cr) as constituent elements. Since the binder phase includes the above three elements as the constituent elements, large amounts of niobium and tantalum are re-precipitated as the constituent components of the second hard phase during cooling after sintering when producing the cemented carbide. Details of the mechanism will be described later.

The mass ratio of Co is preferably more than or equal to 40 mass % and less than or equal to 80 mass % with respect to the total amount of the binder phase. When the mass ratio of Co is less than 40 mass % with respect to the total amount of the binder phase, the denseness of the cemented carbide tends to be decreased to result in decreased hardness. When the mass ratio of Co is more than 80 mass % with respect to the total amount of the binder phase, the mass ratios of Cr and Ni tend to be relatively decreased to result in a decreased ratio of niobium and tantalum being re-precipitated as the constituent components of the second hard phase during the cooling after the sintering.

The mass ratio of Cr is preferably less than or equal to 20 mass % with respect to the total amount of the binder phase, and is more preferably more than or equal to 10 mass % and less than or equal to 20 mass % with respect to the total amount of the binder phase. When the mass ratio of Cr is more than 20 mass % with respect to the total amount of the binder phase, the denseness of the cemented carbide tends to be decreased to result in decreased hardness.

The mass ratio of Ni may be any mass ratio as long as the mass ratio of Co and the mass ratio of Cr fall within the predetermined ranges. For example, the mass ratio of Ni may be more than or equal to 10 mass % and less than or equal to 40 mass % with respect to the total amount of the binder phase.

The mass ratios of Co, Ni and Cr in the binder phase can be determined using the ICP measurement method described above.

In one aspect of the present embodiment, the mass ratio of the total of the cobalt element, the nickel element, and the chromium element to the cemented carbide is preferably more than or equal to 1 mass % and less than or equal to 20 mass %, and is more preferably more than or equal to 3 mass % and less than or equal to 18 mass %. In this way, the mass ratios of the first hard phase and the second hard phase are relatively high. Therefore, the cemented carbide has not only excellent reaction resistance and heat resistance but also excellent hardness. The mass ratio of the total of the cobalt element, the nickel element, and the chromium element to the cemented carbide can be determined using the ICP measurement method described above.

(Area Ratio of Binder Phase)

The area ratio of the binder phase to the arbitrary surface or arbitrary cross section of the cemented carbide according to the present embodiment is preferably more than or equal to 1% and less than or equal to 20%, and is more preferably more than or equal to 4% and less than or equal to 16%. When the area ratio of the binder phase falls in the above-described range, the area ratios of the first hard phase and the second hard phase (both the hard phases are phases each having higher hardness than that of the binder phase) in the cemented carbide can be increased to result in high hardness of the cemented carbide as a whole. Further, adhesion strength between the first hard phase or the second hard phase and the binder phase can be increased. Therefore, the cemented carbide has more excellent toughness.

It should be noted that the area ratio of the binder phase can be calculated in the same manner as in the measurement of the area ratio of the first hard phase, as follows: the binder phase is specified in a predetermined visual field, the total of the areas of the binder phase is calculated, and the total of the areas of the binder phase is divided by the area of the predetermined visual field. Preferably, in the same cemented carbide, the above image analysis is performed in a plurality of visual fields (for example, 5 or more visual fields), and the average value thereof is regarded as the area ratio of the binder phase.

Examples of the other element(s) in the binder phase include iron (Fe), copper (Cu), and the like. One of the other element(s) may be used or two or more of them may be used in combination. Further, the binder phase may include: tungsten and carbon, each of which is a constituent element of the first hard phase; niobium and tantalum, each of which is a constituent element of the second hard phase; and other inevitable component element(s). The other element(s) in the binder phase are permitted to be included therein as long as the function as the binder phase (the function of binding the WC grains included in the first hard phase, binding the carbide grains included in the second hard phase, or binding the WC grains included in the first hard phase and the carbide grains included in the second hard phase) is not compromised. In one aspect of the present embodiment, it is understandable that the constituent element(s) other than the first hard phase and the second hard phase are included in the binder phase.

<<Method of Producing Cemented Carbide>>

The cemented carbide of the present embodiment can be produced representatively through the following steps: a source material powder preparation step→a mixing step→a molding step→a sintering step. Hereinafter, each of the steps will be described.

<Preparation Step>

The preparation step is a step of preparing all the source material powders of the materials for the cemented carbide. Examples of the source material powders include: WC particles to serve as the first hard phase; carbide particles to serve as the second hard phase; and particles including Co, particles including Ni, and particles including Cr, each of which is to serve as the binder phase.

(WC Particles)

The WC particles serving as the source material are not particularly limited, and WC particles generally used for production of cemented carbides may be used. Commercially available WC particles may be used. Examples of the commercially available WC particles include "Uniform Tungsten Carbide Powder" series provided by Allied-Material; and the like.

The average particle size of the WC particles serving as the source material is preferably more than or equal to 0.1 μm and less than or equal to 10 μm, and is more preferably more than or equal to 0.5 μm and less than or equal to 3 μm. Since the average particle size of the WC particles serving as the source material is more than or equal to 0.1 μm, toughness tends to be high when the cemented carbide is formed. Therefore, in a cutting tool including the cemented carbide as a substrate, chipping or breakage due to mechanical and thermal impact can be suppressed. Further, the cutting tool is improved in crack propagation resistance to suppress crack propagation, thereby suppressing chipping or breakage. On the other hand, since the average particle size is less than or equal to 10 μm, hardness tends to be high when the cemented carbide is formed. Therefore, in the cutting tool including the cemented carbide as a substrate, deformation during cutting is suppressed, thereby further suppressing wear.

(Carbide Particles)

The carbide particles serving as the source material is not particularly limited as long as the carbide particles include niobium or tantalum as a constituent element. The carbide particles may be produced by a known method, or commercially available carbide particles may be used without modification. Examples of the carbide particles serving as the source material include NbC particles, TaC particles, NbTaC particles, NbWC particles, TaWC particles, and NbTaWC particles. One type of the above-listed carbide particles may be used solely or two or more types of them may be used in combination.

The average particle size of the carbide particles serving as the source material is preferably more than or equal to 0.1 μm and less than or equal to 5 μm, and is more preferably more than or equal to 0.3 μm and less than or equal to 1 μm. Since the average particle size of the carbide particles serving as the source material is more than or equal to 0.1 μm, toughness tends to be high when the cemented carbide is formed. Therefore, in a cutting tool including the cemented carbide as a substrate, chipping or breakage due to mechanical and thermal impact can be suppressed. Further, the cutting tool is improved in crack propagation resistance to suppress crack propagation, thereby suppressing chipping or breakage. On the other hand, since the average particle size is less than or equal to 5 μm, hardness tends to be high when the cemented carbide is formed. Therefore, in the cutting tool including the cemented carbide as a substrate, deformation during cutting is suppressed, thereby further suppressing wear.

(Particles Including Co)

The particles including Co (hereinafter, also referred to as "Co-containing particles") and serving as the source material are not particularly limited, and Co-containing particles generally used for production of cemented carbides may be used. Examples of the Co-containing particles include: particles composed of Co solely (Co particles); and particles composed of a Co alloy. As the Co alloy, any Co alloy can be used as long as the Co alloy is generally known (for example, a NiCo alloy, a CoCr alloy, or the like). Commercially available Co-containing particles may be used.

The FSSS particle size (average particle size measured by the Fisher Sub-Sieve Sizer) of the Co-containing grains is preferably more than or equal to 0.5 μm and less than or equal to 50 μm. The Fisher Sub-Sieve Sizer refers to a method of determining the particle size of a particle by measuring the specific surface area of the particle using flow resistance of air. The FSSS particle size can be measured using, for example, Fisher Sub-Sieve Sizer Model 95 (manufactured by Fisher Scientific).

(Particles Including Ni)

The particles including Ni (hereinafter, also referred to as "Ni-containing particles") and serving as the source material are not particularly limited, and Ni-containing particles generally used for production of cemented carbides may be used. Examples of the Ni-containing particles include: particles composed of Ni solely; and particles composed of a Ni alloy. As the Ni alloy, any Ni alloy can be used as long as the Ni alloy is generally known (for example, a NiCo alloy, a NiCr alloy, or the like). Commercially available Ni-containing particles may be used.

The FSSS particle size (average particle size measured by the Fisher Sub-Sieve Sizer) of the Ni-containing particles is preferably more than or equal to 0.5 μm and less than or equal to 50 μm.

(Particles Including Cr)

The particles including Cr (hereinafter, also referred to as "Cr-containing particles") and serving as the source material are not particularly limited, and Cr-containing particles generally used for production of cemented carbides may be used. Examples of the Cr-containing particles include: particles composed of Cr solely; and particles composed of a Cr alloy. As the Cr alloy, any Cr alloy can be used as long as the Cr alloy is generally known (for example, a NiCr alloy, a CoCr alloy, or the like). Commercially available Cr-containing particles may be used.

The FSSS particle size (average particle size measured by the Fisher Sub-Sieve Sizer) of the Cr-containing particles is preferably more than or equal to 0.5 μm and less than or equal to 50 μm.

<Mixing Step>

The mixing step is a step of mixing the source material powders prepared in the preparation step. By the mixing step, a powder mixture having the source material powders mixed therein is obtained. It should be noted that the mass ratios of the source material powders (for example, the WC particles, the carbide particles, the particles including Co, the particles including Ni, the particles including Cr, and the like) at the time of mixing can be appropriately set to attain desired area ratios of the first hard phase, the second hard phase, and the binder phase. The mass ratio of each of the source material powders is, for example, a mass ratio described in an Example. A known apparatus can be used in the mixing step. For example, an attritor, a rolling ball mill, a Karman mixer, a bead mill, or the like can be used. Further, the mixing may be performed in a solvent such as water, ethanol, acetone, or isopropyl alcohol. The mixing may be performed with a binder such as polyethylene glycol or paraffin wax.

The mass ratio of the WC particles when the source material powders are mixed is preferably more than or equal to 50 mass % and less than or equal to 98 mass % with respect to the whole of the source material powders, and is more preferably more than or equal to 80 mass % and less than or equal to 95 mass % with respect to the whole of the source material powders.

The mass ratio of the carbide particles when the source material powders are mixed is preferably more than or equal to 1 mass % and less than or equal to 30 mass % with respect to the whole of the source material powders, and is more preferably more than or equal to 2 mass % and less than or equal to 10 mass % with respect to the whole of the source material powders. When a plurality of types of carbide particles are used as the carbide particles for the second hard phase, the mass ratio of the total of these preferably falls within the above range.

The mass ratio of the total of the particles including Co, the particles including Ni, and the particles including Cr when the source material powders are mixed is preferably more than or equal to 1 mass % and less than or equal to 20 mass % with respect to the whole of the source material powders, and is more preferably more than or equal to 4 mass % and less than or equal to 16 mass % with respect to the whole of the source material powders.

A time for mixing the source material powders is not particularly limited, and is set to, for example, be more than or equal to 0.1 hour and less than or equal to 48 hours. In order to uniformly mix the source material powders, the mixing time is preferably set to be more than or equal to 2 hours and less than or equal to 15 hours.

After the mixing step, the powder mixture may be granulated as required. By granulating the powder mixture, the powder mixture is facilitated to be introduced into a die or mold in the below-described molding step. For the granulation, a known granulation method can be applied. For example, a commercially available granulator such as a spray dryer can be used.

<Molding Step>

The molding step is a step of molding the powder mixture obtained in the mixing step into a predetermined shape to obtain a molded body. Molding method and molding condition in the molding step are not particularly limited and general method and condition may be employed. For example, the powder mixture may be introduced into a Ta capsule and may be fed with pressure by pressing, thereby obtaining a molded body. A pressure in the pressing on this occasion may be set to be more than or equal to 10 MPa and less than or equal to 16 GPa.

Examples of the predetermined shape include a cutting tool shape (for example, a shape of an indexable cutting insert).

<Sintering Step>

The sintering step is a step of sintering the molded body obtained in the molding step to obtain a sintered material. In the sintering step, sintering is preferably performed for a sufficient period of time after a liquid phase of the binder phase appears. Specifically, the sintering temperature is preferably more than or equal to 1400° C. and less than or equal to 1600° C. The sintering time is preferably more than or equal to 0.5 hour and less than or equal to 2 hours.

In the production method of the present embodiment, the Co-containing particles, the Ni-containing particles, and the Cr-containing particles are used as the source material powders for the binder phase such that the binder phase has a composition including these three elements. Therefore, the Nb element, the Ta element, and the W element are likely to be re-precipitated as the second hard phase in a cooling process in the sintering. As a result, the obtained cemented carbide has excellent reaction resistance and excellent heat resistance. More specifically, since all of these three elements (Co, Ni, and Cr) are included in the binder phase, the Nb element and the Ta element are facilitated to be re-precipitated as the second hard phase in the cooling process.

An atmosphere during the sintering is not particularly limited, and may be a $N_2$ gas atmosphere, an inert gas atmosphere such as Ar, or a hydrogen gas atmosphere. Further, a degree of vacuum (pressure) at the time of sintering is preferably more than or equal to 0.1 kPa and less than or equal to 10 kPa.

It should be noted that in the sintering step, a sinter HIP process, by which pressure can be applied during the sintering, may be performed. An exemplary HIP condition is as follows: the atmosphere is a $N_2$ gas atmosphere or an inert gas atmosphere such as Ar; the temperature is more than or equal to 1300° C. and less than or equal to 1350° C.; and the pressure is more than or equal to 5 MPa and less than or equal to 200 MPa.

In a cooling process from the maximum temperature to 1200° C., a temperature decrease rate is preferably 2° C./min to 50° C./min in order to facilitate formation of the second hard phase. A temperature decrease rate from 1200° C. to the normal temperature is not particularly limited and can be appropriately set. An atmosphere during each of the cooling from the maximum temperature to 1200° C. and the cooling from 1200° C. to the normal temperature is not particularly limited, and is a $N_2$ gas atmosphere or an inert gas atmosphere such as Ar. A pressure during the cooling is, for example, 0.1 kPa to 10 kPa.

<<Cutting Tool, Wear-Resistant Tool and Grinding Tool>>

Since the cemented carbide of the present embodiment has excellent reaction resistance and excellent heat resistance as described above, the cemented carbide can be used as a substrate of each of a cutting tool, an wear-resistant tool, and a grinding tool. That is, the cutting tool of the present embodiment includes the cemented carbide as a substrate. Likewise, each of the wear-resistant tool and the grinding tool of the present embodiment includes the cemented carbide as a substrate.

The cemented carbide of the present embodiment is widely applicable to conventionally known cutting tool, wear-resistant tool, and grinding tool. Examples of such tools are as follows. Examples of the cutting tool include a cutting bite, a drill, an end mill, an indexable cutting insert for milling, an indexable cutting insert for turning, a metal saw, a gear cutting tool, a reamer, a tap, or the like. Examples of the wear-resistant tool include a die, a scriber, a scribing wheel, a dresser, or the like. Examples of the grinding tool include a grinding wheel, or the like.

The cemented carbide of the present embodiment may constitute a whole of each of these tools. The cemented carbide may constitute a part of each of these tools. Here, the expression "constitute a part" indicates an implementation in which, for example, in the case of the cutting tool, the cemented carbide of the present embodiment is brazed to a predetermined position of an arbitrary substrate so as to serve as a cutting edge portion.

<Coating Film>

The cutting tool according to the present embodiment may further include a coating film provided on the substrate. Each of the wear-resistant tool and the grinding tool according to the present embodiment may further include a coating film provided on the substrate. Examples of the composition of the coating film include a compound of one or more elements selected from a group consisting of a group 4 metal element in the periodic table, a group 5 metal element in the periodic table, a group 6 metal element in the periodic table, aluminum (Al), and silicon (Si), and one or more elements selected from a group consisting of nitrogen (N), oxygen (O), carbon (C) and boron (B). Examples of the group 4 metal element in the periodic table include titanium (Ti), zirconium (Zr), hafnium (Hf) and the like. Examples of the group 5 metal element in the periodic table include vanadium (V), niobium (Nb), tantalum (Ta) and the like. Examples of the group 6 metal element in the periodic table include chromium (Cr), molybdenum (Mo), and the like. Examples of the compound include TiCN, $Al_2O_3$, TiAlN, TiN, TiC, AlCrN, and the like. In the present embodiment, the coating film may be a metal simple substance. In addition, cubic boron nitride (cBN), diamond-like carbon, or the like is also suitable as the composition of the coating film. Such a coating film can be formed by a vapor deposition method such as a chemical vapor deposition (CVD) method or a physical vapor deposition (PVD) method. When the coating film is formed by the CVD method, the coating film is likely to have excellent adhesion to the substrate. Examples of the CVD method include a thermal CVD method and the like. When the coating film is formed by the PVD method, compressive residual stress is applied, thus facilitating an increase in toughness of the cutting tool or the like.

The coating film in the cutting tool according to the present embodiment is preferably provided on a portion of the substrate to serve as a cutting edge and near the portion of the substrate. The coating film may be provided on the entire surface of the substrate. The coating film may be constituted of a single layer or a plurality of layers. The thickness of the coating film may be more than or equal to 1 μm and less than or equal to 20 μm, or may be more than or equal to 1.5 μm and less than or equal to 15 μm.

EXAMPLES

Hereinafter, the present invention will be described in detail with reference to Examples, but the present invention is not limited thereto.

Production of Cemented Carbide

<Preparation of Source Material Powders>

As the source material powders, the following powders (particles) were used.

WC: FSSS particle size: 0.5 μm, 1.2 μm, or 3.5 μm

TaC: FSSS particle size: 1.0 μm

NbC: FSSS particle size: 1.1 μm

Co: FSSS particle size: 1.5 μm

NiCr: FSSS particle size: 1.5 μm

<Mixing of Source Material Powders>

The prepared source material powders were added at blending compositions shown in Tables 1 and 2, and were mixed using an attritor to produce a powder mixture. A mixing condition for the attritor is described below. After the mixing, the powder mixture is spray-dried, thereby obtaining granulation powder.

Mixing Condition for Attritor

Rotation speed of stirrer: 100 rpm

Process time: 12 hours

TABLE 1

| Sample | Mixing Step | | | | | | Sintering Step | |
|---|---|---|---|---|---|---|---|---|
| | Blending Compositions of Source Materials (Mass %) | | | | | | Sintering Temperature | Sintering Time |
| No. | WC | NbC | TaC | Co | Ni | Cr | (° C.) | (Hour) |
| 1 | 90.0 | 4.0 | 0.0 | 3.0 | 2.4 | 0.6 | 1450 | 0.5 |
| 2 | 92.0 | 0.0 | 2.0 | 3.0 | 2.4 | 0.6 | 1450 | 0.5 |
| 3 | 90.0 | 1.4 | 2.6 | 3.0 | 2.4 | 0.6 | 1450 | 0.5 |
| 4 | 84.0 | 4.0 | 0.0 | 6.0 | 4.8 | 1.2 | 1450 | 0.5 |
| 5 | 86.0 | 0.0 | 2.0 | 6.0 | 4.8 | 1.2 | 1450 | 0.5 |
| 6 | 80.0 | 4.0 | 0.0 | 8.0 | 6.0 | 2.0 | 1450 | 0.5 |
| 7 | 92.0 | 4.0 | 0.0 | 2.0 | 1.6 | 0.4 | 1450 | 0.5 |
| 8 | 78.0 | 4.0 | 0.0 | 10.0 | 6.0 | 2.0 | 1450 | 0.5 |
| 9 | 93.0 | 4.0 | 0.0 | 1.5 | 1.2 | 0.3 | 1450 | 0.5 |
| 10 | 76.0 | 4.0 | 8.0 | 6.0 | 4.8 | 1.2 | 1450 | 0.5 |
| 11 | 87.0 | 1.0 | 0.0 | 6.0 | 4.8 | 1.2 | 1450 | 0.5 |
| 12 | 90.0 | 4.0 | 0.0 | 2.0 | 3.0 | 1.0 | 1450 | 0.5 |
| 13 | 90.0 | 4.0 | 0.0 | 5.0 | 0.8 | 0.2 | 1450 | 0.5 |
| 14 | 90.0 | 4.0 | 0.0 | 3.0 | 1.5 | 1.5 | 1450 | 0.5 |
| 15 | 90.0 | 4.0 | 0.0 | 3.0 | 2.4 | 0.6 | 1450 | 0.5 |
| 16 | 90.0 | 4.0 | 0.0 | 3.0 | 2.4 | 0.6 | 1450 | 0.5 |
| 17 | 90.0 | 4.0 | 0.0 | 3.0 | 2.4 | 0.6 | 1450 | 0.5 |
| 18 | 90.0 | 4.0 | 0.0 | 3.0 | 2.4 | 0.6 | 1450 | 0.5 |
| 19 | 76.0 | 4.0 | 0.0 | 10.0 | 7.0 | 3.0 | 1450 | 0.5 |
| 20 | 97.0 | 2.0 | 0.0 | 0.6 | 0.3 | 0.1 | 1450 | 0.5 |

TABLE 2

| Sample No. | Mixing Step | | | | | | Sintering Step | |
|---|---|---|---|---|---|---|---|---|
| | Blending Compositions of Source Materials (Mass %) | | | | | | Sintering Temperature (° C.) | Sintering Time (Hour) |
| | WC | NbC | TaC | Co | Ni | Cr | | |
| 101 | 90.0 | 4.0 | 0.0 | 6.0 | 0.0 | 0.0 | 1450 | 0.5 |
| 102 | 90.0 | 4.0 | 0.0 | 3.0 | 2.4 | 0.6 | 1450 | 0.5 |
| 103 | 92.0 | 0.0 | 2.0 | 3.0 | 2.4 | 0.6 | 1450 | 0.5 |
| 104 | 84.0 | 4.0 | 0.0 | 6.0 | 4.8 | 1.2 | 1450 | 0.5 |
| 105 | 80.0 | 4.0 | 0.0 | 8.0 | 6.0 | 2.0 | 1450 | 0.5 |
| 106 | 92.0 | 4.0 | 0.0 | 2.0 | 1.6 | 0.4 | 1450 | 0.5 |
| 107 | 78.0 | 4.0 | 0.0 | 10.0 | 6.0 | 2.0 | 1450 | 0.5 |
| 108 | 93.0 | 4.0 | 0.0 | 1.5 | 1.2 | 0.3 | 1450 | 0.5 |
| 109 | 90.0 | 4.0 | 0.0 | 3.0 | 2.4 | 0.6 | 1450 | 0.5 |
| 110 | 90.0 | 4.0 | 0.0 | 3.0 | 2.4 | 0.6 | 1450 | 0.5 |
| 111 | 90.0 | 4.0 | 0.0 | 3.0 | 2.4 | 0.6 | 1450 | 0.5 |
| 112 | 90.0 | 4.0 | 0.0 | 3.0 | 2.4 | 0.6 | 1450 | 0.5 |
| 113 | 90.0 | 4.0 | 0.0 | 3.0 | 3.0 | 0.0 | 1450 | 0.5 |
| 114 | 90.0 | 4.0 | 0.0 | 3.0 | 0.0 | 3.0 | 1450 | 0.5 |
| 115 | 90.0 | 4.0 | 0.0 | 0.0 | 6.0 | 0.0 | 1450 | 0.5 |

<Production of Molded Body>

The obtained granulation powder was pressed and molded (under a pressing pressure of 100 MPa) to produce a molded body having a shape of a model number SNG432 (provided by Sumitomo Electric Hardmetal) (indexable cutting insert).

<Sintering of Molded Body>

The obtained molded body was placed in a sintering furnace and sintering was performed in an Ar gas atmosphere (0.5 kPa) at a sintering temperature for a sintering time as shown in Tables 1 and 2.

After completion of the sintering, the sintered material was cooled to a normal temperature in an Ar gas atmosphere. A temperature decrease rate on this occasion was 2° C./min (samples No. 1 to No. 20 as well as samples No. 101 and No. 113 to No. 115) or 50° C./min (samples No. 102 to No. 112). In this way, cemented carbides of samples No. 1 to No. 20 and cemented carbides of samples No. 101 to No. 115 were produced. The cemented carbides of samples No. 1 to No. 20 correspond to examples of the present disclosure. The cemented carbides of samples No. 101 to No. 115 correspond to comparative examples.

Observation of Samples

<Calculation of Average Grain Size of Tungsten Carbide Grains>

Each of the produced cemented carbides of samples No. 1 to No. 20 and samples No. 101 to No. 115 was cut, and the cut surface was processed to be a mirror surface. Thereafter, the cut surface processed to be a mirror surface was subjected to ion milling using an argon ion beam, and the cross section thereof was regarded as an observation sample for a microscope.

The processed surface of this observation sample was captured in image using a scanning electron microscope (SEM) (manufactured by JEOL) at a magnification of about 5000×. For each sample, 10 visual fields were captured in image at each of the outer side of the processed surface and the center of the processed surface.

In each sample, for each one visual field, the grain sizes (Heywood diameters) of 300 or more individual tungsten carbide grains was determined using image analysis type grain size distribution software ("Mac-View" provided by MOUNTECH), and the average grain size of the tungsten carbide grains after the sintering in the total of the 10 visual fields was calculated. It should be noted that by performing element mapping using an energy dispersive X-ray spectroscopy (EDS) apparatus accompanied with the SEM, the grains including W and C were specified as the tungsten carbide grains. Results thereof are shown in Tables 3 and 4.

<Calculation of Average Grain Size of Carbide Grains>

The average grain size of the carbide grains including Nb or Ta was calculated by the same method as in the calculation of the average grain size of the tungsten carbide grains. It should be noted that by performing element mapping using an energy dispersive X-ray spectroscopy (EDS) apparatus accompanied with the SEM, the grains including C and at least one of Nb and Ta were specified as the carbide grains. Results thereof are shown in Tables 3 and 4.

<Calculation of Area Ratio of Each of First Hard Phase, Second Hard Phase and Binder Phase>

Image analysis type grain size distribution software ("Mac-View" provided by MOUNTECH) was used to determine the area ratio of each of the first hard phase, the second hard phase, and the binder phase at the processed surface of each sample. It should be noted that by performing element mapping using an energy dispersive X-ray spectroscopy (EDS) apparatus accompanied with the SEM, a phase including Co, Ni, and Cr was specified as the binder phase. The first hard phase and the second hard phase were specified based on the same criteria as those described above.

<Calculation of Ratio A/B>

Volume ratio A (volume %) of the second hard phase to the cemented carbide and volume ratio B (volume %) of the total of the niobium element and the tantalum element to the cemented carbide were determined by the below-described procedure, and ratio A/B of A to B was calculated.

Volume ratio A was used with the value of the area ratio of the second hard phase being regarded as this volume ratio.

Volume ratio B was determined by ICP emission spectrometry (Inductively Coupled Plasma emission spectrometry) in the following manner.

First, the cemented carbide was pulverized into powder. Next, commercially available nitric acid (concentration of 60%) and hydrofluoric acid (concentration of 55%) were mixed at a volume ratio of 10:3, thereby preparing a mixed acid aqueous solution of the nitric acid and the hydrofluoric acid (hereinafter, also simply referred to as "mixed acid aqueous solution"). The cemented carbide (0.2 g) in the powder form was introduced into the mixed acid aqueous solution (20 ml) and was dissolved by heat treatment to obtain a solution. Thereafter, the solution was diluted at a dilution factor of 5 with water, thereby obtaining a target sample for ICP measurement. Similarly, the same amount of commercially available high-purity tungsten (purity of more than or equal to 99.99%) as that in the case of the cemented carbide was dissolved in the mixed acid aqueous solution. The obtained solution was diluted at a dilution factor of 5 using a commercially available standard solution for ICP measurement, thereby obtaining a standard sample for preparation of a calibration curve of the ICP measurement. Each of the obtained target sample and standard sample was subjected to ICP measurement to determine the content ratios (mass %) of the elements included in the sample. The obtained mass % of each element by the above measurement is converted into the volume % with the value of the specific gravity described in the Handbook of Chemistry (edited by the Chemical Society of Japan) being employed as the density. Then, volume ratio B was calculated using this. On this occasion, in the case of tungsten, calculation was performed on the assumption that all tungsten exists as tungsten carbide, and a numerical value in the Handbook of Chemistry was used for the density of tungsten carbide.

Thereafter, ratio A/B of A to B was calculated. Results thereof are shown in Tables 3 and 4.

TABLE 3

| Sample No. | Volume Ratio A of Second Hard Phase (Volume %) | Volume Ratio B of Ta, Nb (Volume %) | Ratio A/B | Average Grain Size (μm) | |
|---|---|---|---|---|---|
| | | | | WC Grains of First Hard Phase | Carbide Grains of Second Hard Phase |
| 1 | 10.2 | 6.7 | 1.52 | 1.20 | 0.61 |
| 2 | 2.8 | 1.8 | 1.56 | 1.24 | 0.51 |
| 3 | 6.8 | 4.9 | 1.39 | 1.16 | 0.56 |
| 4 | 9.8 | 6.5 | 1.51 | 1.20 | 0.77 |
| 5 | 2.5 | 1.7 | 1.47 | 1.11 | 0.66 |
| 6 | 8.1 | 6.3 | 1.29 | 1.26 | 0.71 |
| 7 | 11.1 | 6.8 | 1.63 | 1.30 | 0.54 |
| 8 | 7.5 | 6.2 | 1.21 | 1.13 | 0.54 |
| 9 | 9.4 | 6.9 | 1.36 | 1.24 | 0.63 |
| 10 | 20.1 | 13.1 | 1.53 | 1.02 | 0.91 |
| 11 | 2.2 | 1.7 | 1.29 | 1.36 | 0.80 |
| 12 | 9.9 | 6.7 | 1.48 | 1.22 | 0.49 |
| 13 | 8.3 | 6.8 | 1.22 | 1.19 | 0.65 |
| 14 | 10.1 | 6.7 | 1.51 | 1.23 | 0.58 |
| 15 | 10.7 | 6.7 | 1.60 | 3.42 | 0.43 |
| 16 | 9.7 | 6.7 | 1.45 | 0.44 | 0.42 |
| 17 | 9.5 | 6.7 | 1.42 | 1.35 | 1.21 |
| 18 | 10.5 | 6.7 | 1.57 | 1.26 | 0.24 |
| 19 | 7.4 | 6.1 | 1.21 | 1.31 | 0.44 |
| 20 | 4.4 | 3.6 | 1.22 | 1.20 | 0.47 |

TABLE 4

| Sample No | Volume Ratio A of Second Hard Phase (Volume %) | Volume Ratio B of Ta, Nb (Volume %) | Ratio A/B | Average Grain Size (μm) | |
|---|---|---|---|---|---|
| | | | | WC Grains of First Hard Phase | Carbide Grains of Second Hard Phase |
| 101 | 4.3 | 6.7 | 0.64 | 1.29 | 0.76 |
| 102 | 6.4 | 6.7 | 0.96 | 1.29 | 0.76 |
| 103 | 1.5 | 1.8 | 0.83 | 1.22 | 0.78 |
| 104 | 6 | 6.5 | 0.92 | 1.23 | 0.76 |
| 105 | 5.9 | 6.3 | 0.94 | 1.18 | 0.69 |
| 106 | 7.2 | 6.8 | 1.06 | 1.36 | 0.52 |
| 107 | 6.6 | 6.2 | 1.06 | 1.11 | 0.56 |
| 108 | 5.1 | 6.9 | 0.74 | 1.27 | 0.55 |
| 109 | 6.1 | 6.7 | 0.91 | 3.33 | 0.51 |
| 110 | 6.8 | 6.7 | 1.01 | 0.41 | 0.44 |
| 111 | 7.4 | 6.7 | 1.10 | 1.26 | 1.35 |
| 112 | 6.3 | 6.7 | 0.94 | 1.36 | 0.22 |
| 113 | 5.1 | 6.8 | 0.75 | 1.28 | 0.75 |
| 114 | 4.1 | 6.7 | 0.61 | 1.29 | 0.77 |
| 115 | 5.2 | 6.8 | 0.76 | 1.29 | 0.74 |

Cutting Test

<Cutting Test 1: Wear Resistance Test>

Each of the cutting tools (hereinafter, also referred to as "cutting tool of sample No. 1" or the like) composed of the cemented carbides of samples No. 1 to No. 20 and samples No. 101 to No. 115 produced as described above was used to measure a cutting time (seconds) until a flank wear amount Vb became 0.2 mm, under the below-described cutting condition. Results thereof are shown in Tables 5 and 6. As the cutting time is longer, the cutting tool can be evaluated to have more excellent wear resistance. A workpiece used in this test is one type of titanium alloy known as a difficult-to-cut material. It is considered that the cutting edge of the cutting tool has a high temperature during the cutting. Hence, as the cutting time is longer, the cutting tool can be evaluated to have more excellent heat resistance.

Condition of Wear Resistance Test
  Workpiece: Ti-6Al-4V (titanium alloy); round bar
  Cutting speed: 90 m/min
  Feed amount: 0.15 mm/rev
  Cut amount: 1.5 mm
  Cutting oil: present

TABLE 5

| Sample No. | Cutting Test 1 Cutting Time (Seconds) | Cutting Test 2 Cutting Time (Seconds) |
|---|---|---|
| 1 | 1161 | 1861 |
| 2 | 904 | 1729 |
| 3 | 1023 | 1801 |
| 4 | 824 | 1609 |
| 5 | 882 | 1646 |
| 6 | 799 | 1583 |
| 7 | 1236 | 1888 |
| 8 | 536 | 804 |
| 9 | 881 | 1684 |
| 10 | 721 | 1563 |
| 11 | 655 | 1561 |
| 12 | 902 | 1706 |
| 13 | 820 | 1632 |
| 14 | 729 | 1538 |
| 15 | 562 | 854 |
| 16 | 1002 | 1788 |
| 17 | 821 | 1652 |
| 18 | 736 | 1606 |
| 19 | 666 | 1521 |
| 20 | 950 | 1792 |

TABLE 6

| Sample No. | Cutting Test 1 Cutting Time (Seconds) | Cutting Test 2 Cutting Time (Seconds) |
|---|---|---|
| 101 | 342 | 564 |
| 102 | 502 | 701 |
| 103 | 484 | 687 |
| 104 | 369 | 592 |
| 105 | 465 | 687 |
| 106 | 623 | 742 |
| 107 | 211 | 385 |
| 108 | 367 | 550 |
| 109 | 185 | 337 |
| 110 | 477 | 643 |
| 111 | 371 | 583 |
| 112 | 328 | 591 |
| 113 | 323 | 549 |
| 114 | 356 | 512 |
| 115 | 333 | 518 |

In comparison between sample No. 8 and sample No. 107, the compositions in the cemented carbides are almost the same. However, it was found that the cutting tool of sample No. 8 in which ratio A/B is more than 1.2 has more excellent wear resistance and heat resistance than those of the cutting tool of sample No. 107 in which ratio A/B is less than 1.2. The same tendency was found in comparison between sample No. 15 and sample No. 109. Further, in comparison between the cutting tools (examples of the present disclosure) of samples No. 1 to No. 20 and the cutting tools (comparative examples) of samples No. 101 to No. 115, it was found that the cutting tools of the examples of the present disclosure generally tend to have more excellent wear resistance and heat resistance than those of the cutting tools of the comparative examples. This suggests that each of the cemented carbides according to the examples of the present disclosure has more excellent hardness and heat resistance than those of the cemented carbides according to the comparative examples because Nb or Ta is localized in the second hard phase, i.e., because ratio A/B is more than 1.2.

<Cutting Test 2: Reaction Resistance Test>

Each of the cutting tools composed of the cemented carbides of samples No. 1 to No. 20 and samples No. 101 to No. 115 produced as described above was used to measure a cutting time (seconds) until a flank wear amount Vb became 0.2 mm under the below-described cutting condition. Results thereof are shown in Tables 5 and 6. In this test, it is considered that wear of a rake face is progressed due to reaction between an iron element in SCM415, which is a workpiece, and a constituent element in the cutting tool during the cutting. Further, it is considered that when the wear of the rake face is progressed, the strength of the cutting edge is decreased, thus resulting in increased wear of a flank face. In consideration of the above, as the cutting time is longer in this test, the reaction resistance can be evaluated to be more excellent. Further, since the wear of the flank face is affected by pure hardness, the determination for reaction resistance is made by comparing cutting times of an example of the present disclosure and a comparative example, in which the respective total masses of the binder phases are close to each other.

Condition of Reaction Resistance Test
  Workpiece: SCM415; round bar
  Cutting speed: 250 m/min
  Feed amount: 0.25 mm/rev
  Cut amount: 1.5 mm In comparison between sample No. 8 and sample No. 107, the compositions in the cemented carbides are almost the same. However, it was found that the cutting tool of sample No. 8 in which ratio A/B is more than 1.2 has more excellent reaction resistance than that of the cutting tool of sample No. 107 in which ratio A/B is less than 1.2. The same tendency was found in comparison between sample No. 15 and sample No. 109. Further, in comparison between the cutting tools (examples of the present disclosure) of samples No. 1 to No. 20 and the cutting tools (comparative examples) of samples No. 101 to No. 115, it was found that the cutting tools of the examples of the present disclosure generally tend to have more excellent reaction resistance than those of the cutting tools of the comparative examples. This suggests that each of the cemented carbides according to the examples of the present disclosure has more excellent reaction resistance than that of each of the cemented carbides according to the comparative examples because Nb or Ta are localized in the second hard phase, i.e., because ratio A/B is more than 1.2.

Heretofore, the embodiments and examples of the present invention have been illustrated, but it has been initially expected to appropriately combine configurations of the embodiments and examples.

The embodiments and examples disclosed herein are illustrative and non-restrictive in any respect. The scope of the present invention is defined by the terms of the claims, rather than the embodiments and examples described above, and is intended to include any modifications within the scope and meaning equivalent to the terms of the claims.

The invention claimed is:

1. A cemented carbide comprising a first hard phase, a second hard phase, and a binder phase, wherein
   the first hard phase is composed of tungsten carbide grains,
   the second hard phase is composed of carbide grains including niobium or tantalum as a constituent element,
   the binder phase includes cobalt, nickel, and chromium as constituent elements,
   at least part of the carbide grains of the second hard phase further include tungsten as a constituent element, and
   a ratio A/B of A volume % representing a volume ratio of the second hard phase to the cemented carbide to B volume % representing a volume ratio of a total of a niobium element and a tantalum element to the cemented carbide is more than 1.2,
   wherein mass ratio of cobalt is 40 mass % or more and 80 mass % or less, mass ratio of chromium is 10 mass % or more and 20 mass % or less, and mass ratio of nickel is 10 mass % or more and 40 mass % or less, each said mass ratio with respect to total mass of the binder phase.

2. The cemented carbide according to claim 1, wherein a mass ratio of a total of a cobalt element, a nickel element, and a chromium element to the cemented carbide is more than or equal to 1 mass % and less than or equal to 20 mass %.

3. The cemented carbide according to claim 1, wherein an area ratio of the second hard phase to an arbitrary surface or arbitrary cross section of the cemented carbide is more than or equal to 1% and less than or equal to 30%.

4. The cemented carbide according to claim 1, wherein an average grain size of the tungsten carbide grains of the first hard phase is more than or equal to 0.1 μm and less than or equal to 10 μm.

5. The cemented carbide according to claim 1, wherein an average grain size of the carbide grains of the second hard phase is more than or equal to 0.1 μm and less than or equal to 5 μm.

6. A cutting tool comprising the cemented carbide recited in claim 1 as a substrate.

7. The cutting tool according to claim 6, further comprising a coating film provided on the substrate.

* * * * *